United States Patent [19]

Sugimoto et al.

[11] 4,262,582
[45] Apr. 21, 1981

[54] CARTON BLANK FOLDING AND GLUING SYSTEM

[75] Inventors: Seiji Sugimoto, Funabashi; Yoshio Ueda, Tokyo; Kunio Somei, Yashio, all of Japan

[73] Assignee: Dainippon Ink and Chemicals Incorporated, Tokyo, Japan

[21] Appl. No.: 19,206

[22] Filed: Mar. 9, 1979

[30] Foreign Application Priority Data

Jun. 7, 1978 [JP] Japan ................................. 53-67625

[51] Int. Cl.³ .............................................. B31B 3/74
[52] U.S. Cl. ...................................... 493/25; 493/128; 493/151
[58] Field of Search .................... 93/49 AC, 49 R, 52, 93/61 AC, 36 R, 53 AC, 36 MM

[56] References Cited

U.S. PATENT DOCUMENTS

| | | | |
|---|---|---|---|
| 3,110,232 | 11/1963 | Frei | 93/49 AC |
| 3,550,510 | 12/1970 | Lenk et al. | 93/61 AC |
| 3,961,781 | 6/1976 | Funk | 270/20 |
| 4,012,996 | 3/1977 | Stolkin et al. | 93/52 X |
| 4,095,511 | 6/1978 | Woolston | 93/58.2 |

*Primary Examiner*—James F. Coan
*Attorney, Agent, or Firm*—Sughrue, Rothwell, Mion, Zinn and Macpeak

[57] ABSTRACT

A carton blank folding and gluing system having a feeder unit, a variety of units, a gluing unit, a stacking unit and belts for continuously conveying carton blanks to the units. The carton blanks are of various types and sizes. The system operates to move only the attachments required for folding or gluing the carton blank to predetermined positions in the units and to retract attachments not required for folding or gluing the carton blank. A control device is provided, in which the predetermined positions of all of the attachments required for folding or gluing the carton blank are automatically determined, stored and outputted by receiving a signal representative of the type of carton blank and signals representative of the dimensions of particular parts of the carton blank.

18 Claims, 25 Drawing Figures

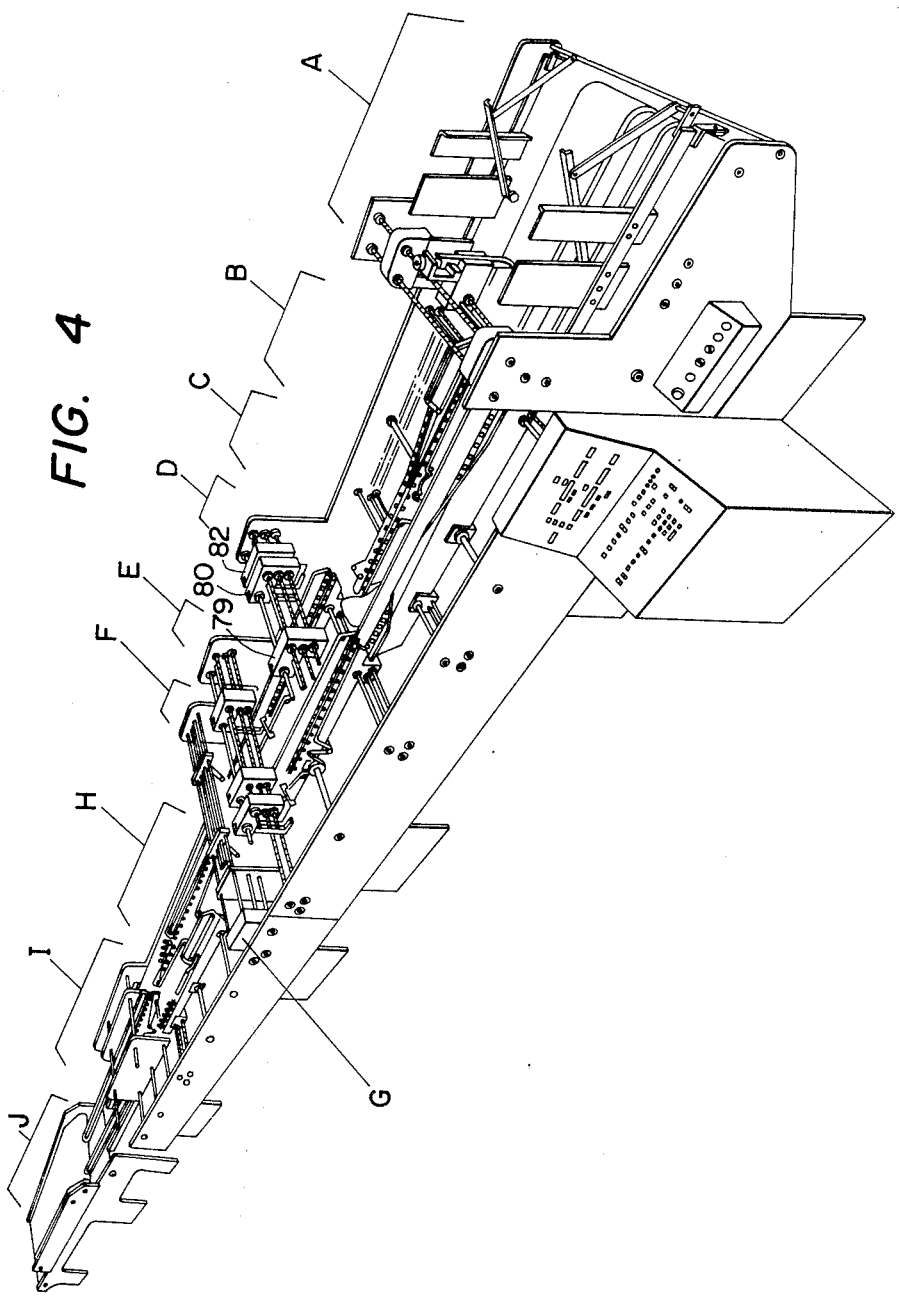

CARTON BLANK FOLDING AND GLUING SYSTEM

BACKGROUND OF THE INVENTION

This invention relates to carton blank folding and gluing devices, and more particularly to a carton blank folding and gluing device in which only the attachments required for folding and gluing a carton blank are automatically moved to their predetermined positions according to the type and size of the carton.

In a conventional carton blank folding and gluing device (hereinafter referred to as "a sack machine" when applicable), a carton blank is conveyed while being clamped by a suitable device. The portions, which are not clamped, are subjected to the steps of prefolding, prefolding restoring, final folding and gluing which are carried out along creases or dashed creases with attachments such as spiral folding plates, hooks, retaining belts, retaining bars and glue applying wheels (hereinafter referred to as "gluing wheels" when applicable).

With such a conventional sack machine, whenever the type or size of carton blank to be processed is changed, the attachments thereof are manually set at the positions which has been predetermined for the particular carton blank. The number of attachments whose positions should be controlled is quite large, and it is rather difficult even for a skilled operator to set all of the attachments at the correct positions. This also takes a long period of time and necessitates several trial runs. Thus, with the conventional sack machine, in the case where carton blanks of many different types are folded and glued or carton blanks which are the same in type but different in size are folded and glued, the preparation time occupies a large proportional part of the overall period of time required for the operation of the machine. Thus, the conventional sack machine is low in efficiency.

SUMMARY OF THE INVENTION

An object of this invention is to overcome the above-described difficulties accompanying a conventional sack machine.

A first feature of the invention is that the various attachments are completely automatically set before the folding and pasting operation is carried out. A second feature of the invention is that in order to realize the first feature of the invention, the necessary attachments are distinguished from the unnecessary attachments according to the types of carton blanks. Also numerical values required for setting the attachments are stored in the form of electrical signal according to the size of carton blanks and are outputted as required to set the attachments at the desired positions.

A third feature of the invention, incorporating the first and second features thereof, characterizes the invention most significantly. The third feature of the invention is that the numerical values necessary for all of the attachments are not individually measured and stored, and instead, among the necessary numerical values only several particular values are inputted into a control device whereby the remaining necessary numerical values are automatically calculated, stored and outputted in the form of electrical signals.

The invention incorporates the features described above, and its arrangement is as follows. In folding and gluing carton blanks after attachments provided on the sack machine and necessary for folding and gluing the carton blanks are automatically moved by suitable driving means, the necessary attachments and the unnecessary attachments are identified by a control device. The attachment retracting mechanisms and driving means thereof are used to retract the unnecessary attachments to positions where they will not obstruct the folding and gluing operation of the sack machine or to hold them at the positions. One suitable line in parallel with the direction of advancement of a carton blank set on the sack machine or a crease or an edge line of a carton blank in parallel with the direction of advancement of the carton blank is employed as a reference line throughout the carton blank folding and gluing process.

An attachment control means is used in which, when reference electrical signals corresponding to the distances between the reference line and a small number of crease or edge lines of the carton blank in parallel with the direction of advancement of the carton blank are inputted, electrical signals corresponding to the distances between the reference line and the predetermined positions of the attachments necessary for the carton blank folding and gluing process are calculated, stored and selectively generated. More specifically, the control device comprises an input circuit, a selection circuit, a counter circuit, a calculation circuit, a memory circuit, a calling circuit, a comparison circuit, an output circuit and an operating circuit cooperating with a microcomputer. The necessary data is stored in the memory circuit as required and electrical signals are produced from the memory circuit. Furthermore, attachment driving means including the above-described attachment retracting mechanism and its driving means is controlled by the electrical signals provided by the control means. The attachment driving means has reversible electric motors with brakes, pulse motors, air cylinders, and hydraulic cylinders for instance so that all of the attachments necessary for the folding and gluing process are automatically moved to positions predetermined according to the types and size of carton blanks.

An integrated circuit (IC) memory circuit may be employed as the above-described memory circuit, and in addition a magnetic drum or a magnetic tape may be employed as the memory circuit.

One preferred embodiment of the invention will be described in detail with reference to the accompanying drawings.

BRIEF DESCRIPTION OF THE DRAWINGS

In the accompanying drawings;

FIG. 4 is a perspective view showing the outline of the entire system according to this invention;

DESCRIPTION OF THE PREFERRED EMBODIMENTS

Figure 1:
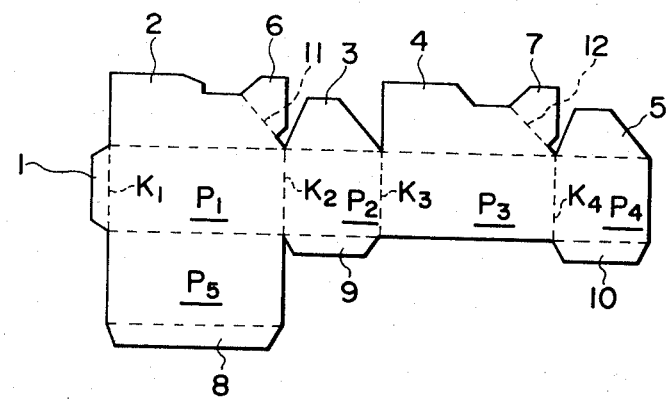
FIG. 1 is a plan view showing an automatic lock bottom type carton blank.

FIG. 1 is a plan view of a lock bottom type carton blank. When a carton is made of the carton blank, panels $P_1$ through $P_4$ becomes the sides thereof, a panel $P_5$ becomes the top (lid). Diagonal flaps 2 and 4, bottom flaps 3 and 5 and diagonal oblique flaps 6 and 7 are locked together to form the lock bottom thereof. A flap 1 is used as a gluing flap for binding the panels $P_1$ and $P_2$ together, and flaps 8, 9 and 10 are to improve the closure of the carton in cooperation with the top panel $P_5$. The carton blank is folded along a first crease $K_1$, a second crease $K_2$, a third crease $K_3$ and a fourth crease $K_4$ in the folding process.

The lock bottom type carton blank is folded by a carton blank folding and gluing device which comprises various units as shown in FIG. 4. The operations of these units will be described briefly.

Referring to FIG. 4, reference character A designates a feeder unit which operates to deliver stacked carton blanks to the following process one after another. Reference character B designates a temporary folding unit which operates to fold the gluing flap 1 along the line $K_1$ and to temporarily fold the panels $P_3$ and $P_4$ along the line $K_3$.

Reference character C designates a prefolding restoring unit operating to restore the parts prefolded by the unit B. Reference character D designates a first final folding unit operating to fold the bottom flaps 3 and 5.

Reference character E designates a second final folding unit operating to fold the diagonal flaps 2 and 4 and the diagonal oblique flaps 6 and 7.

Reference character F designates an upper surface pasting unit operating to apply bonding paste onto the upper surfaces of the diagonal oblique flaps folded by the unit E. Reference character G designates a unit operating to apply bonding paste onto the lower surface of the gluing flap 1.

Reference character H designates a third final fold unit which operates to folding the carton blank along the second crease $K_2$ and the fourth crease $K_4$. Reference character I designates a guide unit which operates to guide the carton blanks to a stacking unit provided in the following process and has a trombone section for overlapping the cartons thus folded.

Reference character J designates the stacking unit which pressurized the glued parts of the cartons which are supplied thereto being overlapped, and stocks them. The control of the trombone should be effectuated in parallel with the direction of advancement of the cartons, and therefore the control signals thereof are inputted, as individual signals, into a control device.

Figure 2:
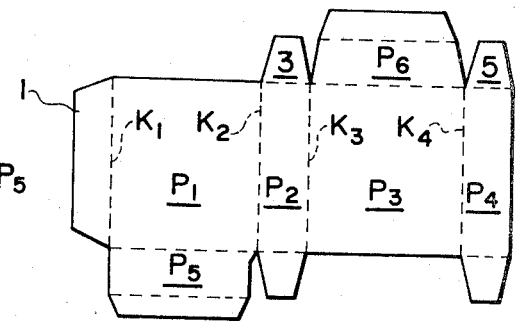
FIG. 2 is a plan view showing a side gluing type carton blank.

In the case where a side pasting type carton blank as shown in FIG. 2 is folded, among the units A through I used in folding the above-described lock bottom type carton blank, the units D, E and F are unnecessary; however, the conveying belts and the carton retaining belts are used. If bottom flap and diagonal flap folding attachments and upper surface gluing attachments are left as they are, they will obstruct the folding of the side gluing type carton blank. Therefore, it is necessary to move these attachments to positions where they will not interrupt the folding of the carton blank. These positions are above the centers of the units or above the outer edges of the unit. However, if the attachments are moved to the positions above the centers of the units, they strike one another, and therefore it is preferable that they are moved to the positions above the outside of the units.

Figure 8:
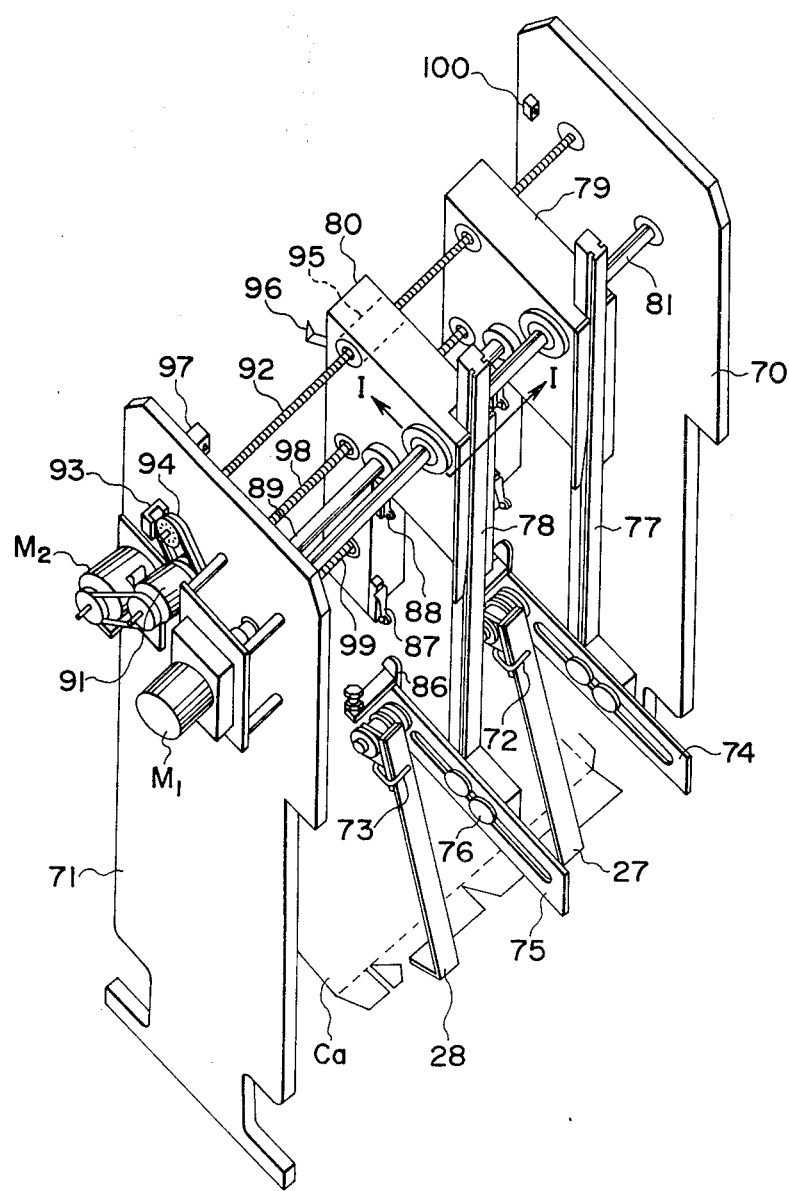
FIG. 8 is a diagram showing a part of a mechanism and its driving means which retracts attachments (hooks in FIG. 8) to positions predetermined according to the type of carton blank.

A mechanism for retracting hooks 27 and 28 and a carton retaining bar 22 in unit D and its driving method will be described by way of example. As shown in FIG. 8, the hooks are retracted to upper positions near the outside frame of the device. The end portions of the hooks 27 and 28 are bent like hooks to fold the bottom flaps 3 and 5. These hooks are mounted to hook mounting plates 74 and 75 and are energized downwardly by springs 72 and 73, respectively. The hook mounting plates 74 and 75 are mounted on racks 77 and 77 which are moved vertically, respectively. The racks 77 and 78 are held by carrier blocks 79 and 80, respectively, which can move along the axis of a rotary shaft 81.

Figure 9:
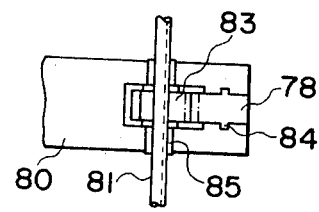
FIG. 9 is a sectional view taken along line I—I in FIG. 8, showing a part of the mechanism illustrated in FIG. 8.

The rack 78 is moved up and down by the rotation of a pinion gear 83 which is provided in the carrier block as shown in FIG. 9. the pinion gear 83 is rotated with the rotary shaft 81 which is in turn rotated by a reversible electric motor $M_1$ with a brake. This is provided on the outside of the frame 71, and the pinion gear 83 together with the carrier block 80 is moved along the axis of the rotary shaft 81, or along a guide shaft 89, by a driving lead screw 92 to be described herein.

The rack 77 is moved up and down in synchronization with the rack 78 by the motor $M_1$ (FIG. 8). However, it should be noted that the carrier block 79 holding the rack 77 is moved along the guide shaft 89 by a lead screw 98 independently of the carrier block 80.

In this example, the carrier block 79 is moved between the frame 70 and the substantially intermediate point between the frames 70 and 71, while the carrier block 80 is moved between the frame 71 and the same intermediate point. However, the movement ranges of these carrier blocks may be changed by the control means. In this unit, the carton retaining bar 22 is provided in such a manner that it is operated by a mechanism similar to those of the hooks 27 and 28; however, it is not shown in FIG. 8.

The hook 27 (or 28) is stopped at either the upper or the lower limit positions. The lower limit position is determined when a striker 86 provided on one end portion of the hook mounting plate 75 is brought into contact with a lower limit switch 87, while the upper limit position is determined when the striker 86 is brought into contact with an upper limit switch 88.

The carrier blocks 79 and 80 are moved only when the hooks 27 and 28 are at the upper limit positions. The movement of the carrier block 80 will be described as a typical example. When the hook is moved upwardly by the motor $M_1$, which is rotated by a lifting signal from the control device described herein, to cause the striker 86 to make contact with the upper limit switch 88, the rotation of the motor is stopped by a signal from the control device.

Thereafter, the control device supplies to a motor $M_2$ and a clutch brake 91 signals by which the carrier block moving lead screw 92 is rotated to move the carrier block 80 towards the frame 71. The lead screw 92 is engaged with a female screw provided in the carrier block 80, and therefore the carrier block 80 approaches the frame 71 with the rotation of the lead screw 92. When the carrier block 80 reaches a predetermined position near the frame 71, a signal is produced by a photo-microswitch 97 provided on the inside of the frame 71 and a slit plate 96 provided on the carrier block 80. As a result the carrier block 80 and the hook 28 are stopped. This stop position will be referred to as "an original position $Y_2$" hereinafter. Similarly as in the above-described case, the carrier block 79 and the hook 27 are moved to an original position $Y_1$ near the frame 70 by a motor $M_3$ (not shown in FIG. 8) and are stopped there. A photo-microswitch 100 and a slit plate (not shown) are provided on the frame 70 and the carrier block 79, respectively.

Figure 10:
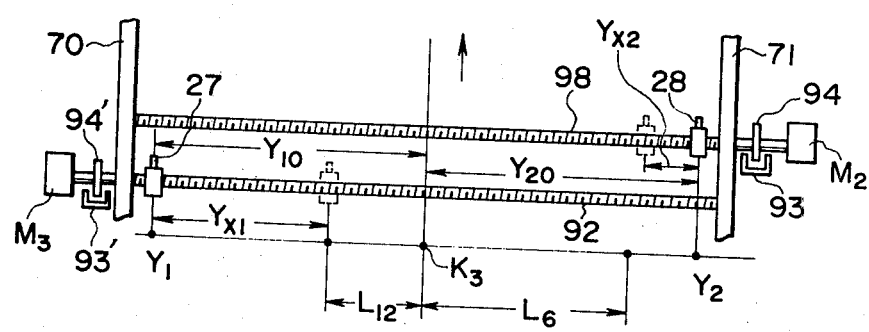
FIG. 10 is a diagram for a description of the detection of position of the attachment.

When signals for moving the hooks 27 and 28 to their predetermined positions where the carton blanks are folded are provided by the control means, the rotation of the motors $M_2$ and $M_3$ is reversed. As a result the carrier blocks are moved inwardly leaving the frames 70 and 71. It is necessary for the carrier blocks 79 and 80 moving inwardly from the original positions $Y_1$ and $Y_2$ to stop at positions which are predetermined from the size of a carton blank to be folded thereby. The movement distances of the carrier blocks and the timing of stopping them at the predetermined positions will be described with reference to FIG. 10.

In this connection, it is assumed that, where the carrier blocks 79 and 80 have the respective original positions $Y_1$ and $Y_2$ and the third crease $K_3$ of the carton blank which is set in alignment with the center of the device is employed as the reference line, the predetermined positions of the hooks 27 and 28 are $L_{12}$ and $L_6$ from reference line $K_3$, respectively. The distance between the point $K_3$ and the position $Y_1$ is $Y_{10}$, and the distance between the point $K_3$ and the position $Y_2$ is $Y_{20}$. The data $K_3$, $L_6$ and $L_{12}$ are described in detail later with reference to FIG. 13.

The data $Y_{10}$, $Y_{20}$, $L_6$ and $L_{12}$ are stored in a memory circuit (or a memory means) in the control means in advance of any manipulative steps. If, when the carrier block 79 is moved a distance $Y_{x1}$ from its original position $Y_1$ ($Y_{10} - Y_{x1} = L_{12}$), the movement of the carrier block 79 is stopped, the carrier block can then be correctly stopped at the predetermined position $L_{12}$. In order to detect the value $Y_{x1}$ which changes with time, a method is provided in which the rotation of the lead screw 98 is converted into a pulse signal by means of an encoder disk 94' which is fixed coaxially with the lead screw 98 and has a number of slits at equal intervals, and a photo-sensor 93' cooperating with the slit disk 94'. The pulse signal is applied to a pulse counter in a pulse counter circuit provided in the control device.

A pulse number corresponding to the distance $Y_{10}$ is set in the pulse counter in advance, and the pulse number is reduced whenever the pulse signal is inputted to the pulse counter from the photo-sensor 93'. Hence, an electrical signal corresponding to the resultant pulse number, or the movement distance of the carrier block, is provided.

The count value (contents) of the pulse counter and the set value $L_{12}$ stored in the memory circuit of the control means are subjected to comparison continuously in a comparison circuit. When ($Y_{10} - Y_{x1} = L_{12}$) is obtained, the control means provides a signal to instantaneously stop the motor $M_3$ adapted to rotate the lead screw 98.

The carrier block 80 and a carrier block 82 (FIG. 4) for the carton retaining bar 22 are controlled similarly as in the case of the above-described carrier block 79.

When the carrier blocks 79, 80 and 82 are stopped at their predetermined positions, the control means supplies a control signal to rotate the motor $M_1$ so that the racks 77 and 78 are moved downwardly. When the hooks 77 and 78 are moved to the lower limit levels by means of the strikers 86 and the lower limit switches 87, the motor $M_1$ is stopped.

An attachment retracting mechanism and its driving means similar to those of the unit D can be employed for the final folding unit E which operates to fold the diagonal flaps 2 and 4 and diagonal oblique flaps 6 and 7 of the carton blank shown in FIG. 1.

Figure 11:
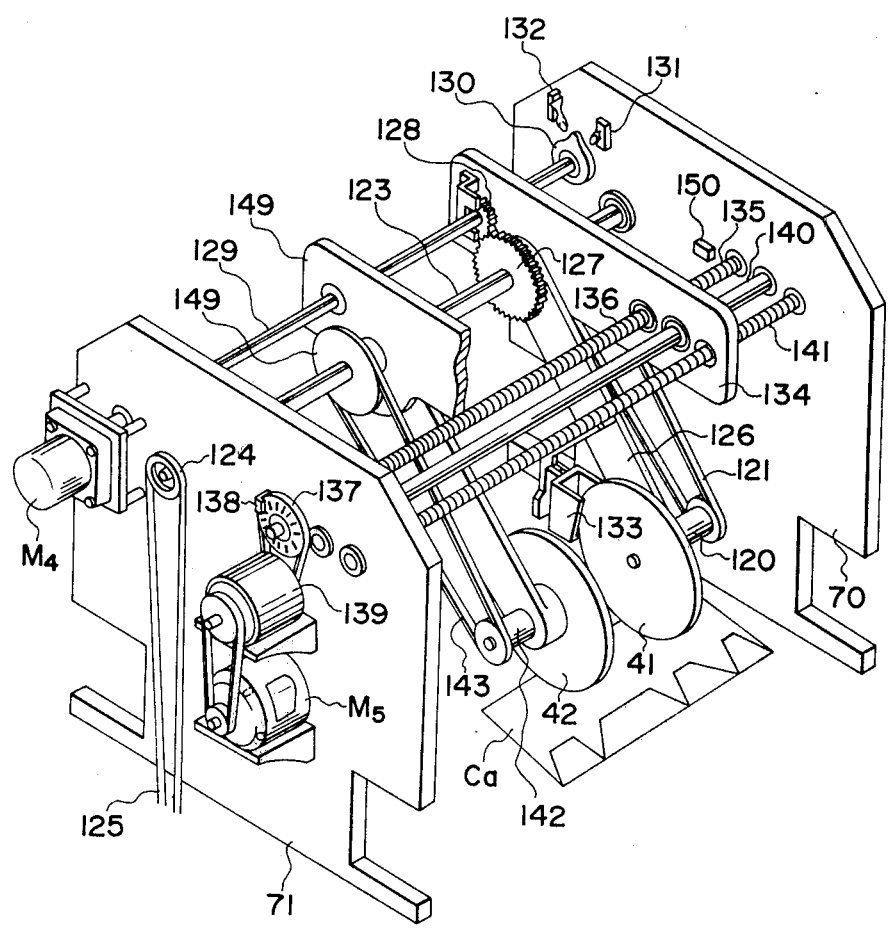
FIG. 11 is a diagram showing the mechanism for retracting another attachment.

The attachment retracting mechanism and its driving means of the upper surface gluing unit F will be described with reference to FIG. 11.

Since the gluing wheels 41 and 42 of the unit F must be rotated in synchronization with the driving of the carton blank folding device body, the gluing wheels 41 and 42 have special retracting mechanisms. Since the gluing wheels 41 and 42 are similar in construction and function to each other, only the gluing wheel 41 will be described. In FIG. 11, the gluing wheel 41 is at its lower limit position, that is, it is ready for starting its pasting work.

When, under this condition, a set switch of the control means is depressed, the control means applies a gluing wheel elevating signal to a reversible motor $M_4$ with a brake, which operates to move the gluing wheel vertically. As a result the motor $M_4$ is rotated. The rotation of the motor $M_4$ is transmitted to a rotary shaft 129 and a pinion gear 128, which are provided for vertically moving the gluing wheel. A gear 127 engaging with the pinion gear 128 will then be rotated and an arm 126 fixedly secured to the gear 127 is swung. A paste container 133, a gluing wheel shaft 120 and the pasting wheel 41 are provided on the other end portion of the arm 126, and they are moved vertically with the movement of the arm 126.

Although, the movement direction of these parts is not in the vertical direction, that is, they make an arced motion around a gluing wheel rotary shaft 123. A cam 130 is fixedly secured to one end portion of the rotary shaft 129. When the cam 130 depresses an upper limit switch 132, the control means outputs a signal for stopping the rotation of the motor $M_4$. As a result, when the motor M₄ is stopped, the pasting wheel 41 is stopped at the upper limit position. Thereafter, signals for moving the gluing wheel 41 and its carrier block 134 to the original position close to the frame 70 are applied to a reversible electric motor M₅ for moving the carrier blocks and its clutch brake 139.

A carrier blocks moving lead screw 135 is rotated and the carrier block 134 is therefore moved towards the frame 70. The original position is detected by means of a photo-microswitch 150 and a slit plate encoder (not shown), whereupon a stop signal is applied to the motor M₅ and the clutch brake 139 by the control device, so that the carrier block 134 and the gluing wheel 41 engaged therewith are stopped. Similarly as in the case of the unit D described above, the carrier block 134 is moved to the position which is predetermined according to the size of the carton blank. Thereafter the gluing wheel 41 is lowered to a predetermined position and held there.

Referring again to FIG. 11, the pinion gear 128 is rotated with the rotary shaft 129; however, the pinion gear 128 together with the carrier block 134 can be freely slid on the rotary shaft 129. The gear 127 is not fixedly secured to the rotary shaft 123; that is, it is rotated only by the pinion gear 128, and can be slid along the rotary shaft 123 inegrally with the carrier block. In other words, as the carrier block 134 is moved by the lead screw 135, the pinion gear 128 and the gear 127 are moved.

The operations of the gluing wheel 42 and its carrier block 149 are similar to those of the gluing wheel 41 and the carrier block 134. The vertical movement of the gluing wheel 42 is carried out in a synchronized manner by the motor M₄ used to move the gluing wheel 41. However, the lateral movement of the gluing wheel 42 and the carrier block 149 is carried out by an electric motor (not shown) provided on the outside of the frame 70. The other function of the gluing wheel 42 and the carrier block 149 are similar to those of the gluing wheel and the carrier block 134 described above.

In the case where the units D, E and F having the above-described attachment retracting mechanisms are operated, all of the carrier blocks and the attachments are set at the respective original positions in the initial step of starting the carton blank folding work and thereafter they are set at the predetermined positions, respectively. This method is advantageous since the wear pattern of the carrier block moving lead screw is uniform, and the attachments can be positioned precisely because the directions of rotation of the lead screws are not changed at all times when the attachments are set thereat.

The units D, E and F having the attachment retracting mechanisms have been described above. However, as described before, it is preferable that also in setting the attachments of the units A, B, C, G, H, I and J having no attachment retracting mechanism, their original positions are provided, and after being positioned at the original positions the attachments are set at the predetermined positions, respectively, before the carton blank folding operation is started.

Figure 12:
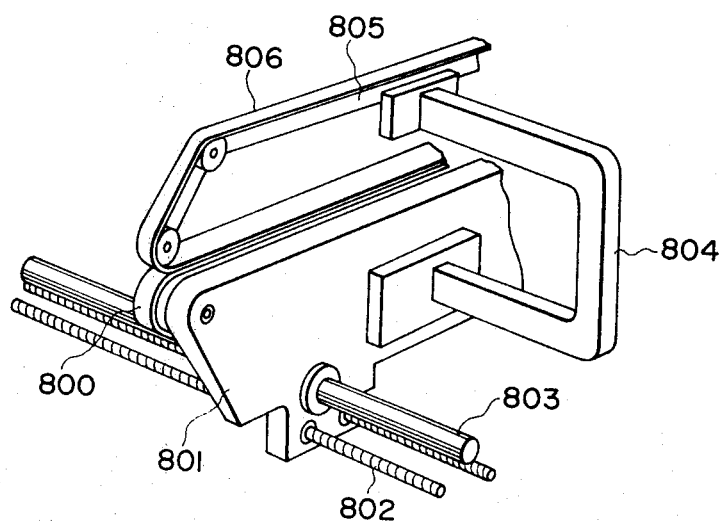
FIG. 12 is a partial diagrammatic view showing the driving mechanism of a retaining belt.

FIG. 12 is a perspective view showing a part of the driving mechanism for driving and retaining belts which has no particular l retracting mechanism. A belt 800 and a holding frame 801 are coupled to a frame moving lead screw 802. The frame 801 is moved along a guide shaft 803 as the lead screw 802 is rotated by an electric motor provided on the outside of a main frame 70 or 71 (FIG. 8). The retaining belt 806 and a holding frame 805 are coupled through a coupling arm 804 to the frame 801, and accordingly the frame 801 is moved together with the holding frame 805. The carton blank is forwarded, being clamped between the belts 806 and 800. The belt 800 is driven by a driving source. The belt 806 is driven by the friction occurring between the belt 806 and the belt 800 or the carton blank. The belts 800 and 806 are set at predetermined positions according to the kinds and size of carton blanks, respectively. The method of setting these belts is similar to those employed for the hooks 27 and 28 and the gluing wheel 41.

In the case of folding the carton blank shown in FIG. 1 with the device according to this invention, all of the attachments required for holding the carton blank are set at the predetermined positions with the aid of a number of control signals stored in the control device. However, these signals are not individually provided to be stored in the control device. Rather, electrical signals provided according to the dimensions of particular parts of the carton blank are inputted into the control device whereby electrical signals corresponding to the predetermined distances of all of the attachments required for holding the carton blank are automatically calculated, stored and outputted as required. It is also possible to allow the control device to erase the stored data thereby to store new data. This will be described hereinafter.

In the following description, it is assumed that the carton blank is advanced straightly from the feeder to the stacker, and the third crease K₃ shown in FIG. 1 is employed as the reference line which is applied to all of the units A through J. Furthermore, it is assumed that the distance between the crease K₃ and the crease K₂ is L₁, and the distance between the crease K₃ and the crease K₁ is L₂, and the distance between the crease Kf₃ and the outer edge of the gluing flap 1 is L₃. These values L₁, L₂ and L₃ correspond to the aforementioned dimensions of particular parts of the carton blank, and are inputted into the control device. In addition to these values, signals representative of the type and size of the carton blank are also inputted into the control devices.

FIGS. 7(A) through (J) show all of the processes of holding the carton blank shown in FIG. 1, and the positional relationships between the carton blank and the attachments in the processes. Table I below also describes all the processes as shown in FIG. 7. In FIG. 7, a carton conveying belt which is below the carton blank and is forcibly driven is not shown, and only the retaining belt is over the carton blank and is driven by the frictional force.

TABLE 1

| Name of Process | | Contents of Process |
| --- | --- | --- |
| A: | Feeder adjustment | Feeder guides 20 and 21 are set. |
| B: | Prefolding | This is a process in which a folding tendency is given to the crease so that when an article is packaged, the carton can be readily formed. The gluing flap 1 is inwardly |

TABLE 1-continued

| Name of Process | Contents of Process |
| --- | --- |
| | folded by turning it through 180° about the line $K_1$ with a spiral folding plate 23 in advance. The panels $P_3$ and $P_4$ are bent inwardly by turning them through 120°–150° about the crease with a spiral folding plate 24. The panels $P_3$ and $P_4$ are not shown in part (B) of FIG. 7. In this process, the carton blank is retained by retaining plates 23' and 24'. |
| C: Restoring of the blank prefolded | The parts prefolded in process (B) are restored with spiral folding plates 25 and 26. The twisting directions are opposite to those of the spiral folding plates used in the process (B). |
| D: First final folding | The bottom flap 3 is allowed to raise with the hook 27, and it is then positively folded while being retained by the retaining belt 31. The bottom flap 5 is allowed to raise with the hook 28, and it is then positively folded with the retaining belt 32. In this case, in order to prevent the rise of the panel $P_4$ together with the flap 5, the end portion of the panel $P_4$ is retained by the retaining bar 22. In this process, the carton blank is retained by the belts 29 and 30. The belts 31 and 32 are behind the hooks. |
| E: Second final folding | While the diagonal flap 2 is caused to rise with the hook 33, the diagonal oblique flap 6 is folded in the opposite direction and along the folding line 11 with the diagonal retainer 35. Similarly, the diagonal flap 4 and the diagonal oblique flap 7 are folded with the hook 34 and the diagonal retainer 36. During this process, the belts 37 and 38 are maintained retracted upwardly so as not to obstruct the folding operation, and the belts 39 and 40 retain the carton blank. The diagonal retainers 35 and 36 move together with the belts 37 and 38, respectively. |
| F: Glue application to the upper surface | The diagonal oblique flaps 6 and 7 are coated with glue with the gluing wheels 41 and 42. During this glue application, the flaps 6 and 7 are retained by the retaining bars 43 and 44, because the rise of the flaps 6 and 7 obstructs the gluing operation. The gluing wheels are integral with the retaining bars, respectively, and these assemblies are controlled on the basis of the retaining bars 43 and 44. Reference numerals 45 through 48 designate retaining belts. The belts 45 and 46 extend half way. |
| G: Glue application to the lower surface | The gluing wheel 49 applies glue to the lower surface of the gluing flap 1. In this case, the upper surface of the gluing 1 is retained by the roller 50 so that it will not rise. The wheel 49 and the roller 50 operate as one unit. The retaining belts 51 and 52 serve to retain the carton blank along the creases $K_2$ and $K_4$. |
| H: Third final folding | The panels $P_1$ and $P_4$ are folded inwardly by turning them through 180° about the lines $K_2$ and $K_4$ with the spiral folding plates 55 and 56, respectively. In this operation, the panel $P_1$ should be folded before the panel $P_4$. During this process, the carton blank is retained by the retaining plates 57 and 58 which are fixedly secured to the front end portions of the spiral folding plates. |
| I: Guiding to the stacker section | The guide belt 59 adapted to guide the carton blank to the stacker section is adjusted. |
| J: Pressurizing of the parts coated with paste, and stacking | In order to completely bond the gluing flap 1 to the panel 4 and the diagonal oblique flaps to the bottom flaps, these parts are pressurized by the pressurizing roll 61 or the pressurizing belt. |

Figure 7:
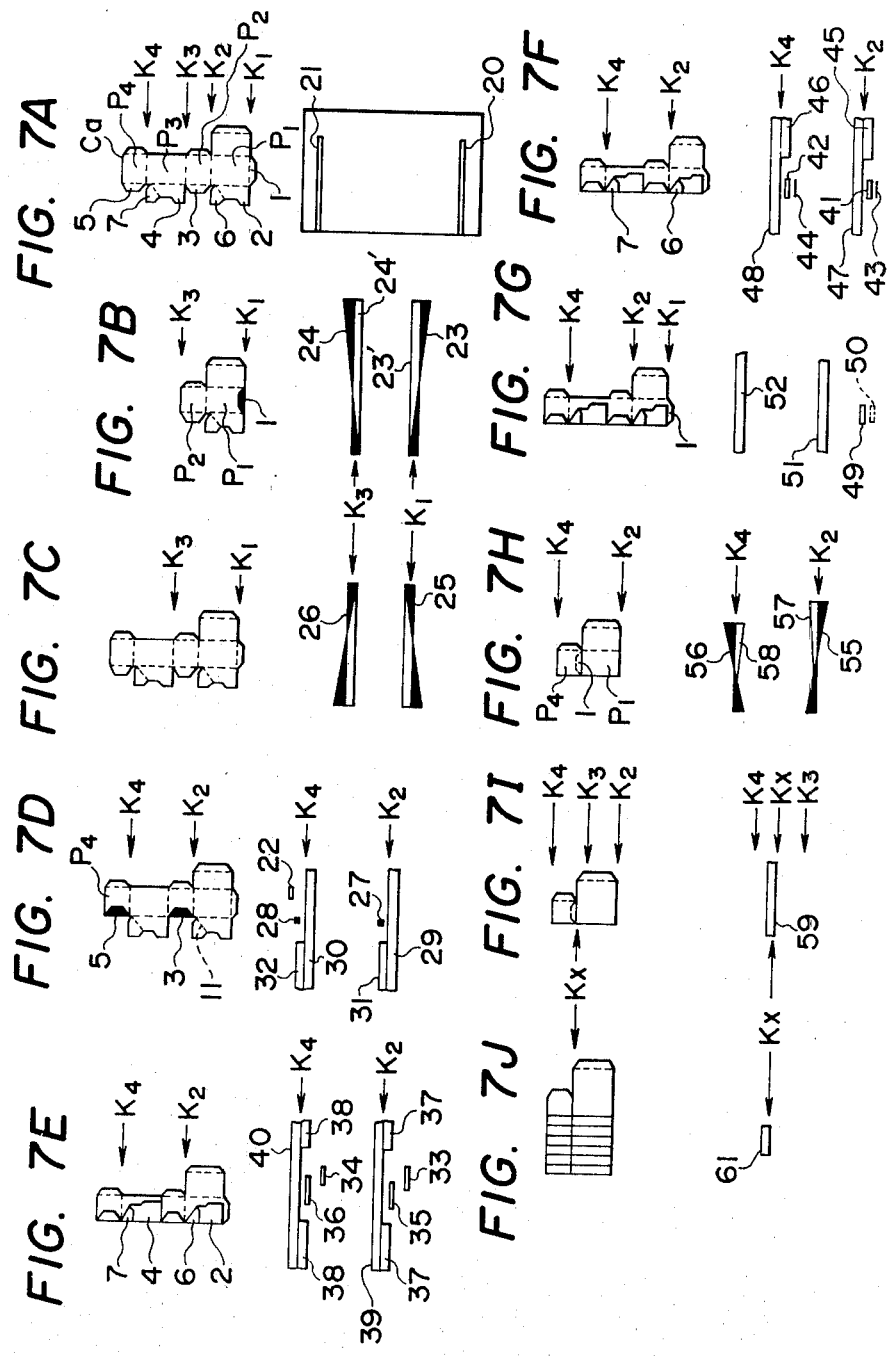
FIGS. 7A-7J are explanatory diagrams showing the steps of folding and gluing a carton blank in the order of various units forming the device according to the invention.

As described above, the attachments whose positions should be controlled are designated by reference numerals 20 though 61 in FIG. 7, and the number of the attachments is approximately forty (40).

In this example, it is necessary to position a large number of attachments as described above. As was described before, the invention relates to the device by which these attachments are set at the predetermined positions automatically based on data stored. In this connection a method of individually measuring and storing the numerical values required for setting the attachments is not employed.

The reason why it is possible to obtain electrical signals coresponding to the numerical values for controlling the many attachments merely by inputting electrical signals corresponding to a small number of particular numerical values, will now be described with reference to FIG. 13.

Figure 13:
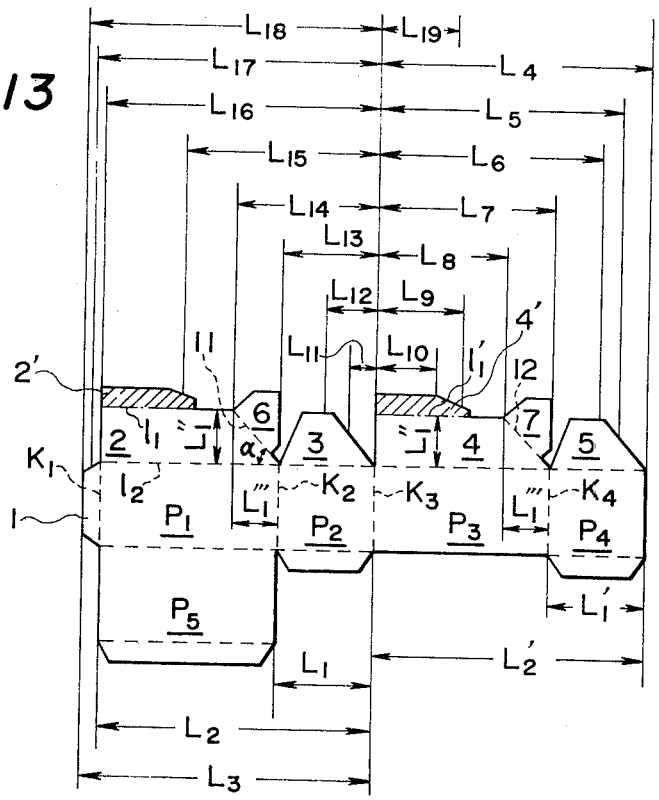
FIG. 13 is a diagram indicating output numerical values to be applied to attachments shown in FIG. 7 for folding and gluing the automatic lock bottom carton blank shown in FIG. 1.

In FIG. 13, the width of the panel $P_2$, a short side wall of the carton is $L_1$. Width $L_2$ is the sum of the width $L_1$ and the width of the panel $P_1$, a long side wall of the carton. Width $L_3$ is the sum of the width $L_2$ and the width of the gluing flap 1. Since the carton is a rectangular parallelopiped, panel $P_1$ is equal in dimension to panel $P_3$, and panel $P_2$ is also equal in dimension to panel $P_4$. Therefore $L_1' = L_1$, and $L_2' = L_2$. Thus, the values $L_1$, $L_2$ and $L_3$ are employed as the input numerical values in this example.

Output numerical values $L_4$ through $L_{19}$ necessary for setting the attachments can be obtained from the aforementioned input numerical values $L_1$, $L_2$ and $L_3$. This will be described in the order of the steps shown in FIG. 7, with reference to FIGS. 7 and 13. In this connection, it should be noted that the numerical values described below are the distances from the reference line $K_3$.

(1) Output numerical values to be applied to the feeder adjusting guides 20 and 21:

For the guide 20, $L_{18} = L_3$; and for the guide 21, $L_4 = L_2$.

(2) Output numerical values to be applied to the spiral folding plates 23 and 24 used for prefolding the carton blank:

Because the prefolding is carried out along the creases $K_1$ and $K_3$, $L_{16} = L_2$ for the spiral folding plate 23. However, the output value is zero (0) for the spiral folding plate 24 because the latter's position is equal to the position of the reference line.

(3) Output numerical values to be applied to the spiral folding plates 25 and 26 used for restoring the prefolded panels and flaps:

Because the positions of the spiral folding plates 25 and 26 are the same as those of the spiral folding plates 23 and 24, the value for the folding plates 25 is $L_2$, the value for the folding plate 26 is zero (0).

(4) Output numerical values to be applied to the hooks 27 and 28, the flap retaining bar 22 and the retaining belts 29 through 32 which are used for folding the bottom flaps 3 and 5:

As it is reasonable to position the hooks 27 and 28 at the centers of the bottom flaps, respectively, $L_{12} = L_1/2$ for the hook 27, and $$L_6 = (L_2 - \frac{L_1}{2})$$

for the hook 28. The retaining bar 22 for the flap 5 is to prevent the panel $P_4$ from being raised by the hook 28, and it is unsuitable to position the retaining bar at a point about ⅓ of the width of the flap 5 from the right-hand end of the carton blank in FIG. 13. Therefore, $$L_5 = (L_2 - \frac{L_1}{3})$$

for the retaining bar 22.

It is necessary to position the retaining belts 29 and 30 along the creases $K_2$ and $K_4$, respectively, and therefore $L_{13} = L_1$ for the retaining belt 29, and $L_7 = L_2 - L_1$ for the retaining belt 30. The retaining belts 31 and 32 are employed to sufficiently fold the flaps 3 and 5 which have been raised by the hooks. The retaining belts 31 and 32 are in contact with the belts 29 and 30, behind the hooks 27 and 28, respectively, and are controlled by the same control signals as those of the belts 29 and 30.

(5) Output numerical values to be applied to the hooks 33, 34 for folding the diagonal flaps 2 and 4, diagonal retainers 35, 36 and the retaining belts 37 through 40 for reversely folding the diagonal oblique flaps 6 and 7:

Since it is necessary to position the hooks 33 and 34 at the centers of the diagonal flaps 2 and 4, respectively, then $$L_{15} = (L_1 + \frac{L_2 - L_1}{2})$$

for the hook 33, and $$L_9 = (\frac{L_2 - L_1}{2})$$

for the hook 34. The retaining belt 37 is positioned to retain the diagonal oblique flap 6, and the retaining belt 39 is positioned along the crease $K_2$. That is, the retaining belts 37 and 39 are positioned on both sides of the crease $K_3$, adjacent to each other. Similarly, the belts 38 and 40 are set on both sides of the crease $K_4$. The belts 37 and 39 or the belts 38 and 40 are controlled equally in synchronization with each other. Therefore, $L_{13} = L_1$ for the belt 37, and $L_7 = L_2 - L_1$ for the belt 38. The diagonal retainer 35 is moved together with the belt 37, while the diagonal retainer 36 is moved together with the belt 38.

(6) Output numerical values to be applied to the upper surface gluing wheels 41 and 42, the diagonal oblique flap retaining bars 43 and 44 and the retaining belts 45 through 48 for applying glue to the reversely folded diagonal oblique flaps 6 and 7:

The wheels 41 and 42 are integrally provided with the diagonal oblique flap retaining bars 43 and 44. Therefore, the wheels are controlled on the basis of the positions of the retaining bars 43 and 44. These retaining bars are required to retain the left end portions of the reversely folded diagonal oblique flaps 6 and 7 in FIG. 13, and the retaining positions are indicated by $L_{14}$ and $L_8$ in FIG. 13, respectively. The values $L_{14}$ and $L_8$ can be readily obtained because of the following reasons.

In FIG. 13, the width of the panel $P_2$ which is the short side wall of the carton is denoted as $L_1$. The diagonal flaps 2 and 4 forming the lock bottom are locked together while their portions 2' and 4' are overlaid one on another with the lines $l_1$ and $l_{1''}$ aligned with each other. Therefore, $L_{1''} = L_1/2$. The folding lines 11 and 12 of the diagonal oblique flaps 6 and 7 form 45° with respect to the folding line $l_2$ and therefore $L_{1'''} = L_{1''} = L_1/2$. Accordingly, $L_8 = L_2 - (1 + 1/2)L_1 = L_2 - 1.5L_1$, and
$L_{14} = L_1 + L_1/2 = 1.5L_1$.

In this case, the carton blank retaining belts 45 and 47 are set at the positions along the crease $K_2$, and the belts 46 and 48 are set at the positions along the crease $K_4$. The belts 45 and 46 terminate before the position of the gluing wheels, and the belts 45 is moved together with the belt 47, while the belt 46 is moved together with the belt 48. Accordingly, it is necessary only to control the belts 45 and 46, in this case. Thus, $L_{13} = L_1$ for the belt 45, and $L_7 = L_2 - L_1$ for the belt 46.

(7) Output numerical values to be applied to the lower surface gluing wheel 49, the retaining roller 50 and the retaining belts 51 and 52 for applying glue to the lower surface of the gluing flap 1:

Basically, the width of the gluing wheel is shorter than the value $L_3 - L_2$ which is the width of the gluing flap 1. The center of the gluing flap 1 is aligned with the center of the gluing wheel. Accordingly, $$L_{17} = L_2 + \frac{L_3 - L_2}{2}$$

for the gluing wheel 49. The retaining roller 50 is moved together with the gluing wheel 49 and accordingly the retaining roller 50 is set at the same position as the gluing wheel with the carton blank being held therebetween.

Since the retaining belts 51 and 52 are set along the crease $K_2$ and $K_3$, respectively, then $L_{13} = L_1$ for the belt 51, and $L_7 = L_2 - L_1$ for the belt 52.

(8) Output numerical values to be applied to the spiral folding plate 55 for inwardly folding the panels 1 and 5 along the crease $K_2$ and to the spiral folding plate 56 for inwardly folding the panel 4 side along the crease $K_4$:

For the folding plate 55, $L_{13} = L_1$; and for the folding plate 56, $L_7 = L_2 - L_1$. In this case, in order that the gluing flap 1 is folded to the inner surface of the panel 4, the folding plate 55 starts its folding operation before the folding plate 56.

(9) Output numerical value to be applied to the guide belt 59 for guiding the folded carton blank to the section operating to pressurize the parts coated with glue:

It is necessary to position the belt 59 to pressurize the glue-coated parts of the central portion of the carton blank. Therefore, $L_{19} = L_2 - 2L_1$ for the belt 59.

(10) Output numerical value to be applied to the pressurizing belt 61 for completely bonding the gluing flap 1 to the panel 4, the diagonal oblique flap 6 to the bottom flap 3, and the diagonal oblique flap 7 to the bottom flap 5:

For belt 61, $L_{19} = L_2 - 2L_1$.

The output numerical values to be applied to the attachments described above can be represented by the reference input numerical values $L_1$, $L_2$ and $L_3$ as indicated in Table 2 below:

TABLE 2

| Reference Value | Unit | Attachment | Value on Reference Values | Work by Unit |
|---|---|---|---|---|
| $L_1$ | A | 20 $L_{18}$ | $L_3$ | Feeder adjustment |
|  |  | 21 $L_4$ | $L_2$ |  |
|  | B | 23 $L_{16}$ | $L_2$ | Prefolding |
|  |  | 24 Reference line | 0 |  |
|  | C | 25 $L_{16}$ | $L_2$ | Prefolding restoring |
|  |  | 26 Reference line | 0 |  |
|  | D | 27 $L_{12}$ | $\frac{1}{2}L_1$ | 1st final folding |
|  |  | 28 $L_6$ | $L_2 - \frac{L_1}{2}$ |  |
| $L_2$ |  | 29 $L_{13}$ | $L_1$ |  |
|  |  | 30 $L_7$ | $L_2 - L_1$ |  |
|  |  | 32 $L_5$ | $L_2 - \frac{L_1}{3}$ |  |
|  | E | 33 $L_{15}$ | $L_1 + \frac{L_2 - L_1}{2}$ | 2nd final folding |
|  |  | 34 $L_9$ | $\frac{L_2 - L_1}{2}$ |  |
| $L_3$ |  | 37 $L_{13}$ | $L_1$ |  |
|  |  | 38 $L_7$ | $L_2 - L_1$ |  |
|  | F | 43 $L_{14}$ | $1.5L_1$ | Application of glue to the upper surface |
|  |  | 44 $L_8$ | $L_2 - 1.5L_1$ |  |
|  |  | 45 $L_{13}$ | $L_1$ |  |
|  |  | 46 $L_7$ | $L_2 - L_1$ |  |
|  | G | 49 $L_{17}$ | $L_2 - \frac{L_3 - L_2}{2}$ | Application of glue to the lower surface |
|  |  | 51 $L_{13}$ | $L_1$ |  |
|  |  | 52 $L_7$ | $L_2 - L_1$ |  |
|  | H | 55 $L_{13}$ | $L_1$ | 3rd final folding |
|  |  | 56 $L_7$ | $L_2 - L_1$ |  |
|  | I | 59 $L_{19}$ | $L_2 - 2L_1$ | Guiding to the stacker |
|  | J | 61 $L_{19}$ | $L_2 - 2L_1$ | Pressurizing the glue-coated parts, and stacking |

The invention has been described with reference to the lock bottom type carton blank; however, the invention is not limited thereto to such a specific blank. That is, the invention can be applied to the carton blanks of other types such as for instance a side gluing type carton blank.

Figure 3:
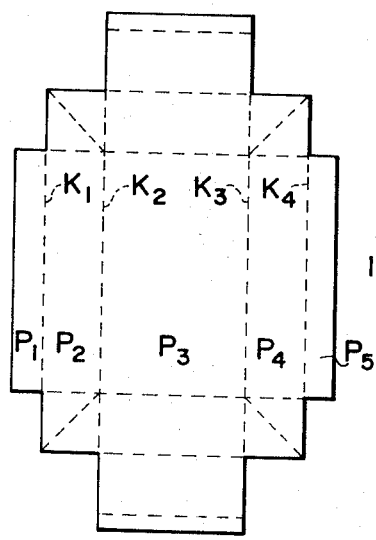
FIG. 3 is a plan view showing a double wall type carton blank.
Figure 14:
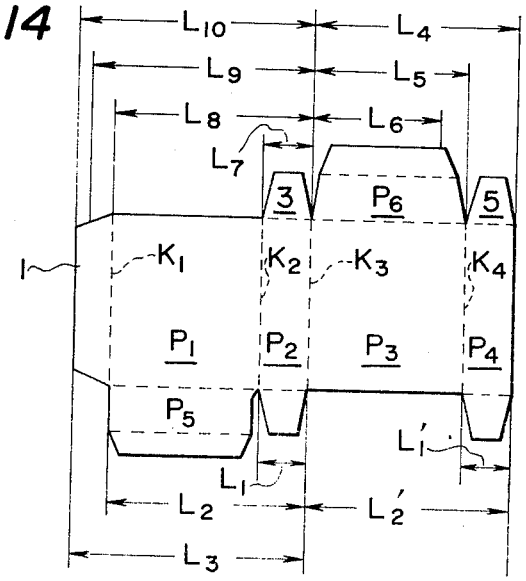
FIG. 14 is a diagram indicating output numerical values to be applied to the attachments for folding and gluing the side gluing type carton blank shown in FIG. 2.

The invention will be further described with reference to the side gluing type carton blank. FIG. 14 is a diagram showing the side gluing type carton blank and output numerical values to be applied to the attachments shown in FIG. 7 in this case. For the same reason described with reference to FIG. 3, $L_{1'} = L_1$, and $L_{2'} = L_2$. As in Table 2, the output numerical values to be applied to the attachments in the processes are as indicated in Table 3 below:

TABLE 3

| Reference value | Unit | Attachment | Value on Reference Values | Work by Unit |
|---|---|---|---|---|
| $L_1$ | A | 20 $L_{10}$ | $L_3$ | Feeder adjustment |
|  |  | 21 $L_4$ | $L_2$ |  |
|  | B | 23 $L_8$ | $L_2$ | Prefolding |

TABLE 3-continued

| Reference value | Unit | Attachment | Output Value to be Applied to attachment | | Work by Unit |
|---|---|---|---|---|---|
| | | | Value on Reference Values | | |
| | | 24 | Reference line | 0 | |
| $L_2$ | C | 25 | $L_8$ | $L_2$ | Prefolding restoring |
| | | 26 | Reference line | 0 | |
| | G | 49 | $L_9$ | $L_2 - \dfrac{L_3 - L_2}{2}$ | Application of glue to the lower surface |
| $L_3$ | | 51 | $L_7$ | $L_1$ | |
| | | 52 | $L_5$ | $L_2 - L_1$ | |
| | H | 55 | $L_7$ | $L_1$ | Final folding |
| | | 56 | $L_5$ | $L_2 - L_1$ | |
| | I | 59 | $L_6$ | $L_2 - 2L_1$ | Guiding to the stacking section |
| | J | 61 | $L_6$ | $L_2 - 2L_1$ | Pressuring the paste-coated parts, and stacking |

In the above description of the invention with reference to the lock bottom type carton blank and the side gluing type carton blank, the third crease $K_3$ is employed as the reference line, and it is generally desirable to use the crease $K_3$.

Figure 15:
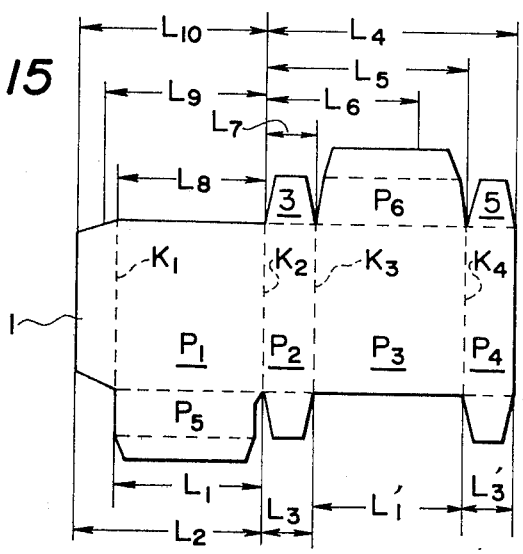
FIG. 15 is a diagram indicating output numerical values to be applied to the attachments for processing the side gluing type carton blank shown in FIG. 2, with the second crease thereof employed as the reference line.

A carton blank shown in FIG. 15 is the same one as that shown in FIG. 2. In this case, the second crease $K_2$ is employed as the reference line. Furthermore, FIG. 15 indicates the determination of input numerical values and the determination of output numerical values to be applied to the various attachments in the case where the carton blank is folded and pasted by the device shown in FIG. 4. The output numerical values $L_4$ through $L_{10}$ for the attachments are represented by the reference input numerical values as indicated in Table 4 below:

to the fact that the reference position is different. The same effects are however obtained in both of the cases.

The reference line is not limited to the above-described third crease $K_3$ and second crease $K_2$. That is the other creases or an edge line of the carton blank can be employed as the reference line. Alternatively, the reference line may be selected at a suitable position on the carton blank, or it may be selected at a position out of the carton blank if applicable.

Figure 16:
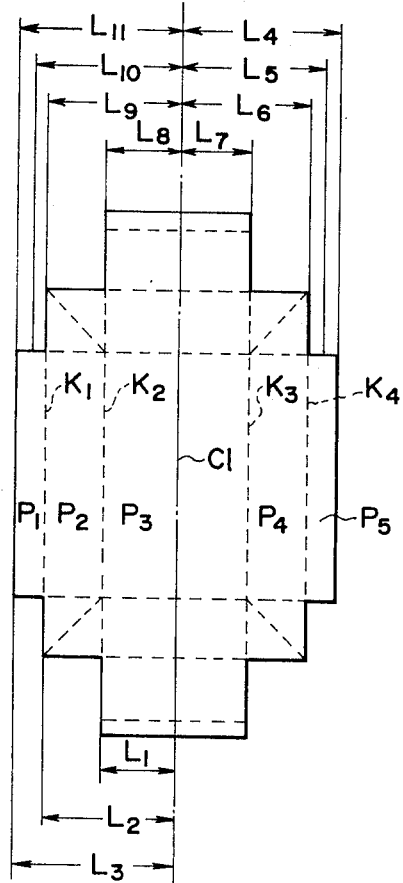
FIG. 16 is a diagram indicating output numerical values to be applied to the attachments for processing the double wall type carton blank shown in FIG. 3.

Now, the case where a double sidewall carton blank is folded and glued will be described. FIG. 16 shows numerical values $L_4$ through $L_{11}$ to be applied to the attachments shown in FIG. 7 and the relations between these numerical values and reference values $L_1$, $L_2$ and $L_3$ to be inputted into the control device. In Table 5, the

TABLE 4

| Reference value | Unit | Attachment | Output Value to be applied to Attachment | | Work by Unit |
|---|---|---|---|---|---|
| | | | Value on Reference Values | | |
| $L_1$ | A | 20 | $L_{10}$ | $L_2$ | Feeder adjustment |
| | | 21 | $L_4$ | $L_1 + 2L_3$ | |
| | B | 23 | $L_8$ | $L_1$ | Folding along creases $K_1$ and $K_2$ |
| | | 24 | $L_7$ | $L_3$ | |
| $L_2$ | C | 25 | $L_8$ | $L_1$ | Restoring of the carton blank folded by the Unit B |
| | | 26 | $L_7$ | $L_3$ | |
| | G | 49 | $L_9$ | $L_1 + \dfrac{L_2 - L_1}{2}$ | Application of paste to the lower surface of the gluing flap (1) |
| $L_3$ | | 51 | Reference line | 0 | |
| | | 52 | $L_5$ | $L_1 + L_3$ | |
| | H | 55 | Reference line | 0 | Final folding along creases $K_2$ and $K_4$ |
| | | 56 | $L_5$ | $L_1 + L_3$ | |
| | I | 59 | $L_6$ | $L_1 + 2L_3 - 2L_3 = L_1$ | Guiding to the stacking section |
| | J | 61 | $L_6$ | $L_1$ | Pressurizing to completely bond the paste-coated parts, and stacking |

As is apparent from FIG. 15 and Table 4, the output numerical values employed in the case where the second crease $K_2$ is employed as the reference line are different from those employed in the case where the third crease $K_3$ is used as the reference line. This is due numerical values to be applied to the attachments are represented by the reference values $L_1$, $L_2$ and $L_3$. In this case, the center line C of the carton blank is employed as the reference line.

TABLE 5

| Reference Value | Unit | Attachment | Value on Reference Values | Output Value to be Applied to Attachment | Work by Unit |
|---|---|---|---|---|---|
| $L_1$ | A | 20 | $L_4$ | $L_3$ | Feeder adjustment |
|  |  | 21 | $L_{11}$ | $L_3$ |  |
|  | B | 23 | $L_7$ | $L_1$ | Folding along 2nd and 3rd creases |
|  |  | 24 | $L_8$ | $L_1$ |  |
|  | C | 25 | $L_7$ | $L_1$ | Restoring of the folded carton blank |
|  |  | 26 | $L_8$ | $L_1$ |  |
| $L_2$ | D | 29 | $L_7$ | $L_1$ | Conveying to the next unit |
|  |  | 30 | $L_8$ | $L_1$ |  |
|  | E | 38 | $L_7$ | $L_1$ | Conveying to the next unit |
|  |  | 37 | $L_8$ | $L_1$ |  |
| $L_3$ | F | 41 | $L_5$ | $L_2 + \dfrac{L_3 - L_2}{2}$ | Application of paste to the central portions of the panels $P_1$ and $P_5$ |
|  |  | 42 | $L_{10}$ | $L_2 + \dfrac{L_3 - L_2}{2}$ |  |
|  | G | 51 | $L_7$ | $L_1$ | Conveying to the next unit |
|  |  | 52 | $L_8$ | $L_1$ |  |
|  | H | 55 | $L_6$ | $L_2$ | Final folding of the panels $P_1$ and $P_5$ along 1st and 4th creases |
|  |  | 56 | $L_9$ | $L_2$ |  |
|  | I | 59 | $L_6$ | $L_2$ | Conveying while retaining the paste-coated parts so that they may not rise. |
|  |  | 59' | $L_9$ | $L_2$ |  |
|  | J | 61 | $L_6$ | $L_2$ | Pressurizing the paste-coated parts, and stacking. |
|  |  | 61' | $L_9$ | $L_2$ |  |

Note:
although 59' and 61' are not shown in FIG. 7, two belts are used in this example.

As is apparent from the above description, according to the invention, in folding and gluing the carton blank with the sack machine the output numerical values necessary for setting a large number of attachments are calculated and stored in the control device having a micro-computer or suitable calculation circuits and memory elements according to the predetermined input numerical values. The output numerical values are outputted as many times as required, and the attachments required for folding and gluing the carton blank are automatically and quickly moved to the predetermined positions with high accuracy by the outputted electrical signals of the control device. Thus, the carton blank folding and gluing system according to the invention can accomplish its preparation for work readily in a very short item as compared with the conventional device. Therefore, the economical effort of the device according to the invention is considerably improved over the piror art.

As was described above, it is necessary to provide the calculation circuits adapted to perform addition and subtraction for the control device of the system according to the invention, so that a small number of particular reference values are applied thereto to produce a number of output numerical values. In the control device, the calculation circuits and the memory elements are correctly selected in response to the instruction signal instantaneously, and upon application of the output instruction signal the selection of the stored signals is carried out correctly and instantaneously.

The device according to the invention and its operation will be described with reference to FIG. 5, which is a block diagram of the control device and FIG. 6 which shows an operating panel.

Figure 5:
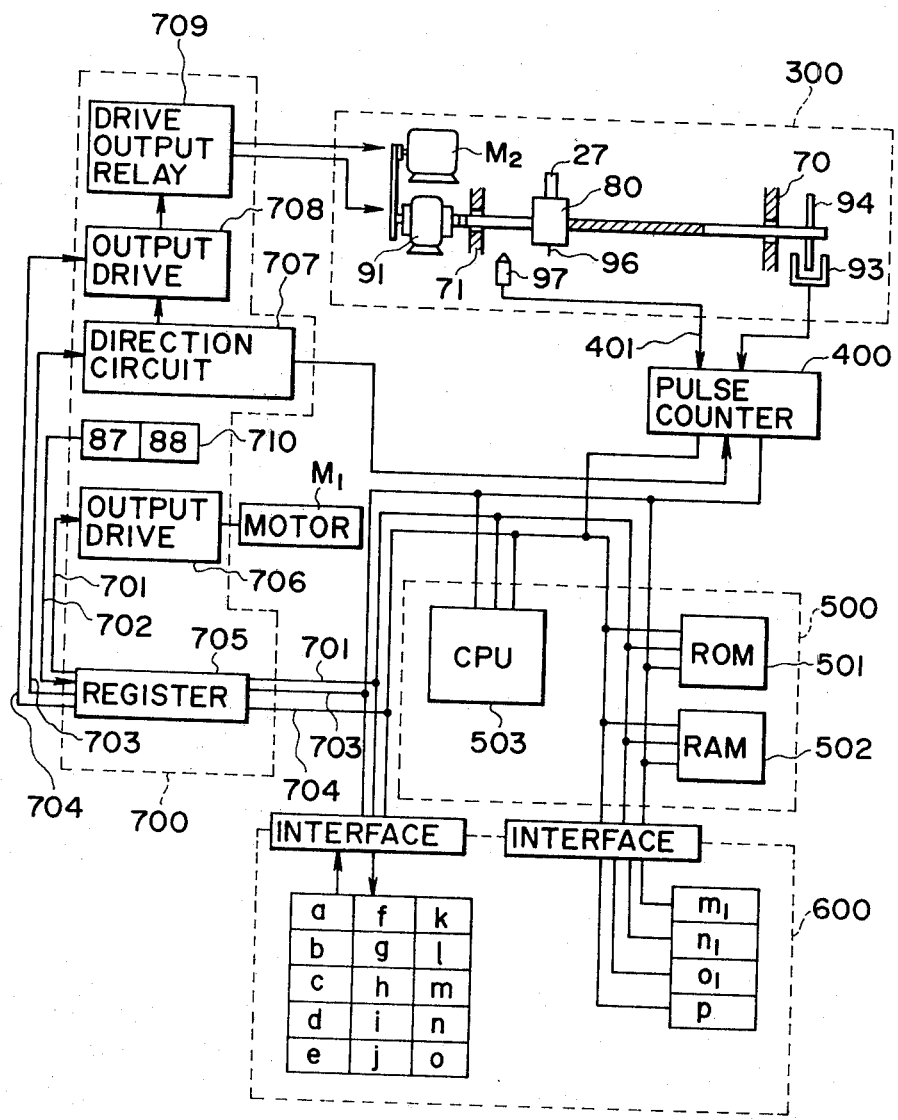
FIG. 5 is a block diagram for a description of the operation of the device according to the invention.
Figure 6:
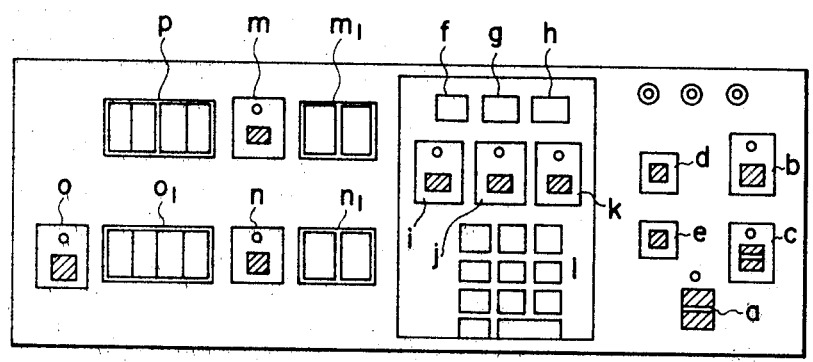
FIG. 6 shows an operating panel.

Referring to FIG. 5, a portion of the mechanical section of the system according to the invention (that is the unit D) is surrounded by the broken line 300, and the control means for controlling the attachments of the device according to the invention is constituted by blocks 400, 500, 600 and 700. More specifically, the block 400 is a pulse counter circuit for detecting the amount of displacement or the predetermined positions of the attachments and the units, the block 500 is a calculation and memory circuit section. Block 600 is a operating panel section, and the block 700 is a drive output relay circuit section.

Block 500 includes a central processing unit (CPU) 503 for carrying out calculations, a read only memory (ROM) 501 in which calculation formulas have been stored, and a random access memory (RAM) 502 for storing data. The CPU may be any commercially available micro-processor.

In block 600, reference characters a through o designate push button switches on the operating panel (FIG. 6) and reference characters $m_1$, $n_1$, $o_1$ and p designate a display section.

The drive output relay circuit section 700 comprises: a control register 705, the output drive circuit 706 of the electric motor $M_1$ and a limit signal circuit 710 provided for the drive controlling limit switches 87 and 88 of the motor $M_1$. A circuit 707 is used for determining the sense of direction of rotation of the motor $M_2$. The output drive circuit 708 of the motor $M_2$ is coupled to the drive output relay 709 of the motor $M_2$. The blocks 400 and 700 are provided in all of the units of the device as described with respect to FIG. 4.

A procedure of storing the signals for controlling the attachments in the memory circuits of the control device will be described with reference to FIG. 5. More specifically, a three-input system in which the data $L_1$, $L_2$, and $L_3$ employed as the reference values are inputted thereinto will be described.

(1) A carton blank is measured for the reference values $L_1$, $L_2$ and $L_3$.

(2) One of the carton selection switches f, g and h is depressed according to the kind of the carton blank.

(3) The carton number (which is a code provided for every kind and size) input switch m is depressed, and then the carton specifying number thereof is specified by using the ten-key 1. The number is displayed on the display unit $m_1$.

(4) The reference input number switch n is depressed, and the specified number is designated by the ten-key 1. The number thus designated is displayed on the display unit $n_1$.

(5) The value $L_1$ corresponding to the reference input number is stored by operating the setting switch o and ten-key 1. The value $L_1$ is displayed on the display unit $o_1$.

The values $L_2$ and $L_3$ can be stored by repeating the operations of the above described steps (4) and (5).

(6) Upon inputting of the aforementioned reference values $L_1$, $L_2$ and $L_3$ into the block 500 in FIG. 5, the CPU cooperates with the ROM having calculation circuits corresponding to the calculation formulas shown in the above-described Tables 2 through 4, so that the output numerical values $L_4$ through $L_{19}$ (cf. FIG. 11) obtained from the values $L_1$, $L_2$ and $L_3$ are calculated. These output numerical values together with the reference input values $L_1$, $L_2$ and $L_3$, being related to the corresponding carton number, are stored in the RAM.

The procedure in which after necessary data having been stored, a carton blank is folded and glued according to the data thus stored will be described with reference to the unit D by way of example.

(1) The carton number is inputted by means of the carton number switch m and the ten-key 1 thereby to call the data of the carton blank to be processed.

(2) The start switch b provided for the CPU, ROM and RAM is depressed. (3) The CPU outputs a hook (27) elevating signal 701 and as a result the hook 27 is elevated. (4) When a limit signal 702 (outputted by the upper limit switch 88 in FIG. 8) indicating the completion of the upward movement is applied to the CPU, the CPU outputs a rotation stop signal which is applied to the hook elevating motor. Subsequently, a motor rotation direction signal 703 for moving the carrier block 80 towards the frame 71 is applied through the motor rotation direction determining circuit 707 to the motor $M_2$ by the CPU, and a motor output signal 704 is applied through the output drive circuit 708 to the motor $M_2$ and the clutch brake 91 by the CPU. (5) When the carrier block 80, or the hook 27, reaches the original position, the photo-microswitch 97 outputs an original position signal 401 which is applied through the counter circuit 400 to the CPU. As a result, the motor stopping output signal 704 is applied to the motor $M_2$ and the clutch brake 91 by the CPU.

(6) The signals 703 and 704 are provided by the CPU again, so that the carrier block 80, or the hook 27, is moved towards the predetermined position. As soon as the rotation of the lead screw 92 is started, the photo-sensor 93 outputs the pulse and the pulse counter circuit 400 starts its counting operation. As a result, the distance of movement of the carrier block is continuously detected and the detection result is applied to the CPU. In the CPU, the present position is detected from the output signal of the counter circuit. The detection result is compared with a signal corresponding to the predetermined position of the carrier block 80, or the hook 27. Upon coincidence, the CPU produces a motor ($M_2$) stop signal to stop the carrier block 80.

(7) When the hook 27 is lowered to the lower limit position by a hook (27) lowering signal 701 produced by the CPU, a limit signal 702 is applied to the CPU (from the limit switch 87 in FIG. 8). As a result a rotation stop signal is applied to the hook elevating motor by the CPU.

The folding attachment 27 is set at the correct position through the above-described steps.

It should be noted that the above-described operation is effectuated in all of the units A through J simultaneously in a parallel mode. However, the operation is not carried out for the attachments the operations of which are not required according to the kinds of carton blank.

The invention has been described with reference to the carton blank folding and gluing device having the units A through J; however, the invention is not limited thereto. That is, this invention is applicable to all types of the carton blank folding and gluing devices which have attachment retracting mechanisms, and in which data stored in and outputted from control device are not individually inputted thereinto. Instead an extremely small number of reference data are inputted into the control device so that output numerical values for controlling the attachments are calculated.

For purposes of illustration, the following chart provides representative model numbers for the major components of the system shown in FIG. 5. It is apparent that the remaining components, like those identified are standard industry known items that can be suitably method to the major components.

| Manufacturer | Model | CPU | Bit number | RAM | ROM |
| --- | --- | --- | --- | --- | --- |
| NEC | TK-80 | $\mu$PD8080A | 8 | $\mu$PD5101 | $\mu$PD454 |
| INTEL | 8080 | 8080A | 8 | 8111 | 8708/8308 |
| MOTOROLLA | 6800 | MPU6800 | 8 | MCM6810 | MCM6830 |
| TOSHIBA | EX-12/5 | T3190 | 12 | TMM312P | TMM121C |
| FUJITSU LTD. | L-KIT16 | MN1610 | 16 | MB8111 | MB8518EC |

We claim:

1. In a carton blank folding and gluing system having a feeder unit, a plurality of folding and gluing sections having operating attachments and a stacking unit; means for continuously conveying carton blanks to said sections, said carton blanks being of various types and sizes, the improvement comprising; means to move the operating attachments required for working on said carton blank to predetermined positions in said sections and to retract said attachments not required for working on said carton blank; and control means for determining predetermined positions of all of the attachments required for working on said carton blank, said control means storing said position data and generating an output following receipt of a signal representative of the type of carton blank and the dimensions of particular parts of said carton blank to selectively move said operating attachments to operating or retracted positions.

2. The system of claim 1 further comprising, means to sense the position of said operating attachments to be moved, means providing an output signal of said means to sense and deliver said output signal to said control means.

3. The system of claim 2 wherein said control means comprises calculation means and memory means.

4. The system of claim 3 wherein said memory means comprises a read only memory having stored therein information relative to calculations to be performed by said calculation means and a random access memory for storing the output of said means providing an output signal in response to said sensing means.

5. The system of claims 2 or 4 wherein means providing an output signal comprises encoder means responsive to rotational position of said operating attachment and a pulse counter responsive to said encoder means.

6. The system of claim 5 further comprising switch means for selectively actuating said pulse counter.

7. The system of claims 1 or 3 further comprising display means responsive data stored in said control means.

8. The system of claim 7 further comprising input means for providing data indicative of the type of carton blank and the dimension of particular parts of said carton blank to said control means.

9. The system of claims 1, 3 or 4 further comprising output drive relay means receiving the output of said control means and selectively moving said operating attachments.

10. The system of claim 9 wherein said output drive relay means comprises a control register receiving the output of said control means, an output drive circuit for initiating action of an operating attachment and limit means to terminate action when said operating attachment reaches a predetermined position.

11. The system of claim 10 wherein said limit means provides a limit signal through said register to said control means.

12. The system of claim 11 wherein the means for continuously conveying carton blanks comprises belt means disposed between said sections.

13. The system of claim 1 wherein said folding and gluing sections include a prefolding section where said blank is partially folded to establish a folding tendency for portions to be used when said carton is formed.

14. The system of claims 13 further comprising a restoration section for restoring said carton blank to a flat condition.

15. The system of claims 1 or 14 wherein said folding and gluing sections include a plurality of first final folding sections for folding flaps of said carton in the formation thereof.

16. The system of claim 15 wherein said folding and gluing sections include a gluing section disposed following said first final folding sections to apply glue to selective portions of said carton flaps.

17. The system of claim 16 further comprising a second final folding section for completing the folding of the carton panels.

18. The system of claim 16 wherein said folding and gluing sections further include a pressurizing section to complete the bonding of carton flaps by the application of pressure to parts having glue disposed thereon.

* * * * *